(12) United States Patent
Zeng et al.

(10) Patent No.: US 11,126,824 B2
(45) Date of Patent: Sep. 21, 2021

(54) FACE IMAGE QUALITY EVALUATING METHOD AND APPARATUS AND COMPUTER READABLE STORAGE MEDIUM USING THE SAME

(71) Applicant: UBTECH ROBOTICS CORP LTD, Shenzhen (CN)

(72) Inventors: Yusheng Zeng, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 16/805,827

(22) Filed: Mar. 1, 2020

(65) Prior Publication Data
US 2021/0192184 A1 Jun. 24, 2021

(30) Foreign Application Priority Data
Dec. 23, 2019 (CN) .......................... 201911338517.0

(51) Int. Cl.
*G06K 9/40* (2006.01)
*G06K 9/00* (2006.01)
(Continued)

(52) U.S. Cl.
CPC ............ *G06K 9/00255* (2013.01); *G06T 7/11* (2017.01); *G06T 7/136* (2017.01); *G06T 2207/20221* (2013.01)

(58) Field of Classification Search
CPC ....... G06K 9/00255; G06T 7/136; G06T 7/11; G06T 2207/20221
See application file for complete search history.

(56) References Cited

U.S. PATENT DOCUMENTS

| 6,130,617 A * | 10/2000 | Yeo | G06K 9/00604 340/575 |
| 7,539,342 B2 * | 5/2009 | Tabata | G06T 5/008 358/518 |
| 7,796,787 B2 * | 9/2010 | Wang | G06T 11/60 382/118 |

(Continued)

FOREIGN PATENT DOCUMENTS

| CN | 107194374 A | * | 9/2017 |
| CN | 105184273 B | * | 7/2018 |

(Continued)

OTHER PUBLICATIONS

Automatic Red-Eye Detection and correction, Matthew Gaubatz et al., IEEE, 0-7803-7622-6, 2002, pp. I-804 to I-807 (Year: 2002).*

*Primary Examiner* — Jayesh A Patel

(57) ABSTRACT

The present disclosure provides a face image quality evaluating method as well as an apparatus and a computer-readable storage medium using the same. The method includes: obtaining a face image; determining a local bright area in the face image, wherein the local bright area is formed by an illumination source in the face image, and the brightness of the local bright area is greater than the brightness of a face area in the face image; removing the local bright area from the face image; and evaluating a quality of the face image based on the face image having removed the local bright area. In the above-mentioned manner, the present disclosure improves the accuracy of the quality evaluation of the face image.

18 Claims, 9 Drawing Sheets

(51) Int. Cl.
  *G06T 7/136* (2017.01)
  *G06T 7/11* (2017.01)

(56) References Cited

U.S. PATENT DOCUMENTS

| | | | | |
|---|---|---|---|---|
| 8,477,996 B2* | 7/2013 | Zschau | ................ | G06K 9/0061 |
| | | | | 382/103 |
| 2004/0131236 A1* | 7/2004 | Chen | ................ | G06K 9/00248 |
| | | | | 382/118 |
| 2005/0141762 A1* | 6/2005 | Zhao | ................ | G06K 9/00234 |
| | | | | 382/164 |
| 2005/0271295 A1* | 12/2005 | Tabata | ................ | G06T 5/002 |
| | | | | 382/274 |
| 2006/0188144 A1* | 8/2006 | Sasaki | ................ | G06T 17/10 |
| | | | | 382/154 |
| 2009/0060293 A1* | 3/2009 | Nagao | ................ | G06K 9/00221 |
| | | | | 382/118 |
| 2009/0153689 A1* | 6/2009 | Shih | ................ | H04N 5/23219 |
| | | | | 348/222.1 |
| 2013/0141605 A1* | 6/2013 | Kim | ................ | H04N 1/3872 |
| | | | | 348/222.1 |
| 2014/0301599 A1* | 10/2014 | Shin | ................ | G06K 9/036 |
| | | | | 382/103 |
| 2014/0348400 A1* | 11/2014 | Ohta | ................ | G06K 9/00268 |
| | | | | 382/118 |
| 2019/0147216 A1* | 5/2019 | Yang | ................ | G06F 3/013 |
| | | | | 382/103 |
| 2019/0205689 A1* | 7/2019 | Huang | ................ | G06K 9/00281 |
| 2020/0005021 A1* | 1/2020 | Akagi | ................ | G06K 9/00228 |

FOREIGN PATENT DOCUMENTS

| | | | | |
|---|---|---|---|---|
| CN | 108682030 A | * | 10/2018 | |
| JP | 2002269545 A | * | 9/2002 | |
| JP | 2006031620 A | * | 2/2006 | |
| KR | 20030050306 A | * | 6/2003 | |

* cited by examiner

FACE IMAGE QUALITY EVALUATING METHOD AND APPARATUS AND COMPUTER READABLE STORAGE MEDIUM USING THE SAME

CROSS REFERENCE TO RELATED APPLICATIONS

The present disclosure claims priority to Chinese Patent Application No. 201911338517.0, filed Dec. 23, 2019, which is hereby incorporated by reference herein as if set forth in its entirety.

BACKGROUND

1. Technical Field

The present disclosure relates to image processing technology, and particularly to a face image quality evaluating method as well as an apparatus and a computer storage medium using the same.

2. Description of Related Art

In face recognitions, the quality of face images needs to be analyzed to estimate the accuracy of face recognition. However, due to the affection of the natural lights or ambient lights of the shooting scene, there may be local bright areas in the captured images. When evaluating the quality of these images, these brighter areas will cause interferences, which results in a difference between the evaluation results and the true results, so that the quality of the face image is impossible to be evaluated accurately, and the accuracy of face recognition is affected.

BRIEF DESCRIPTION OF THE DRAWINGS

In order to more clearly illustrate the technical solutions in the embodiments of the present disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

Figure 1:
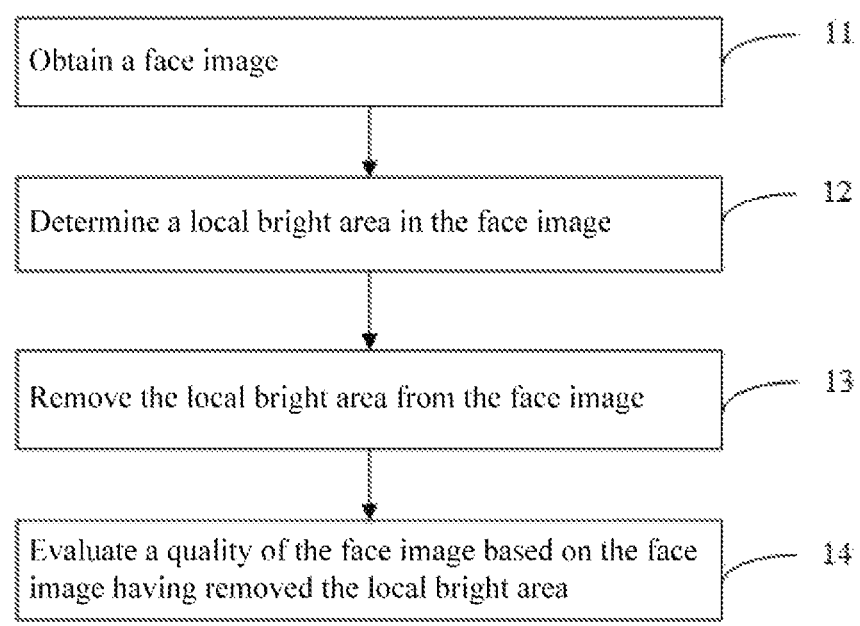
FIG. 1 is a flow chart of an embodiment of a face image quality evaluating method according to the present disclosure.
Figure 7:
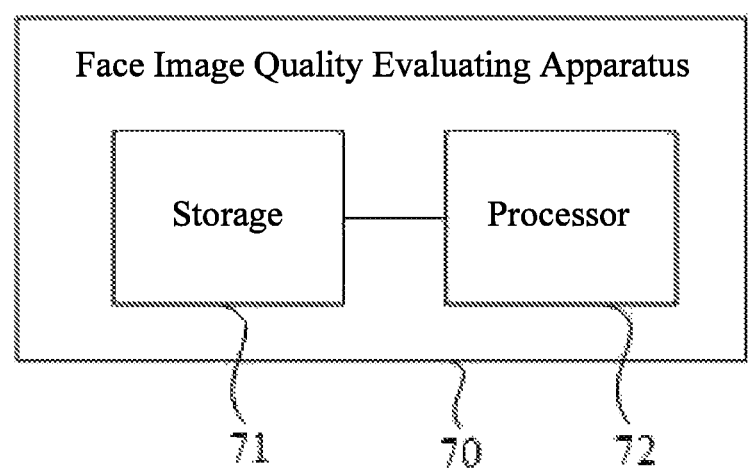
FIG. 7 is a schematic block diagram of an embodiment of a face image quality evaluating apparatus according to the present disclosure.
Figure 8:
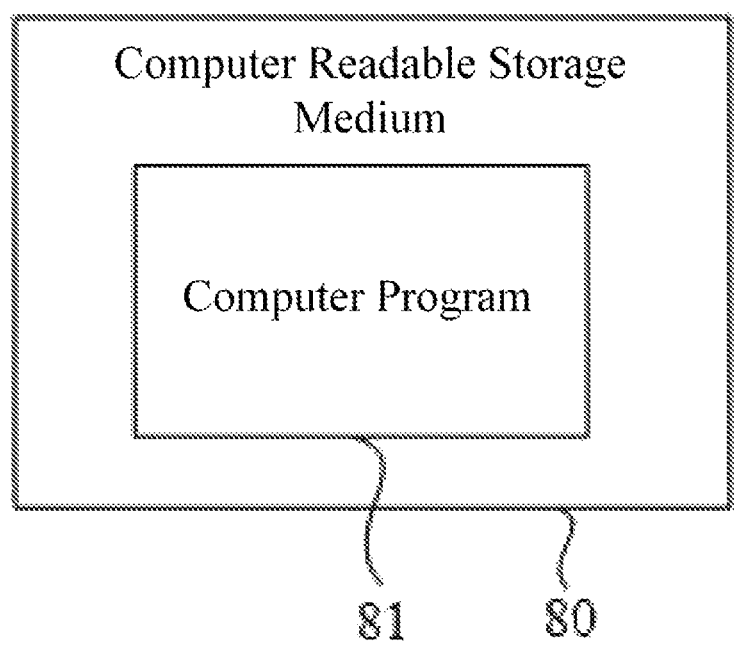
FIG. 8 is a schematic block diagram of an embodiment of a computer readable storage medium according to an embodiment of the present disclosure.

FIG. 1 is a flow chart of an embodiment of a face image quality evaluating method according to the present disclosure. In this embodiment, a face image quality evaluating method is provided. The method is a computer-implemented method executable for a processor, which may be implemented through and applied to a face image quality evaluating apparatus as shown in FIG. 7 or implemented through a computer readable storage medium as shown in FIG. 8. As shown in FIG. 1, the method includes the following steps.

11: obtaining a face image.

Figure 2:
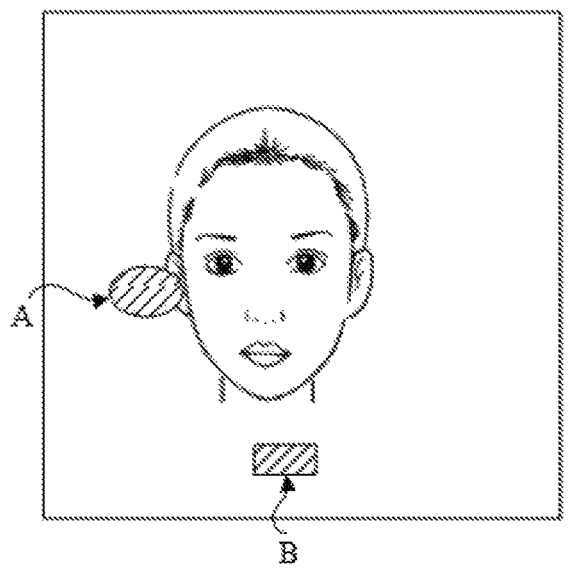
FIG. 2 is a schematic diagram of an example of local bright areas in a face image according to the embodiment of FIG. 1.

In order to evaluate the quality of the face image, a face image is obtained first, where the face image can be a grayscale image or a color image. The face image includes at least one local bright area. FIG. 2 is a schematic diagram of an example of local bright areas in a face image according to the embodiment of FIG. 1. As shown in FIG. 2, the shape of the local bright area can be rectangular, oval, square, or irregular shape, for example, the oval local bright area A and the rectangle local bright area B. An imaging device such as a camera can be used to capture the face image including a face (e.g., a human face) or an image including a local bright area can be selected from a face database to take as the face image.

12: determining a local bright area in the face image.

The local bright area is formed by an illumination source (e.g., the sun or a lamp) in a shooting scene of the face image, and the brightness of the local bright area is greater than the brightness of a face area (i.e., an area in the face image where a face is located) in the face image. The face image is processed to extract the local bright area from the face image. For example, as shown in FIG. 2, the positions and the grayscale values of the local bright areas A and B are determined.

13: removing the local bright area from the face image.

After the local bright area is recognized from the face image, the face image is processed to remove the local bright area(s) so as to reduce the influence of the local bright area to the evaluation of the quality of the face image.

14: evaluating a quality of the face image based on the face image having removed the local bright area.

After removing the local bright area in the face image, the quality of the face image is evaluated. As an example, the quality of the face image can be evaluated by calculating the root mean squared error (RMSE), peak signal to noise ratio (PSNR), structural similarity (SSIM). Laplacian squared error (LSE), or the like between the face image after removing the local bright area and a reference face image.

In this embodiment, a method for evaluating the quality of a face image is provided. Since the illumination source in the shooting scene may affect the evaluation of the quality of the face image, the local bright area is extracted from the obtained face image first, then the local bright area is eliminated from the face image, and then a quality evaluation is performed on the face image that has removed the local bright areas, which can suppress the bright without damaging other features, eliminate the interference of the bright on the quality evaluation of the image, thereby improving the accuracy of the quality evaluation of the face image.

Figure 3:
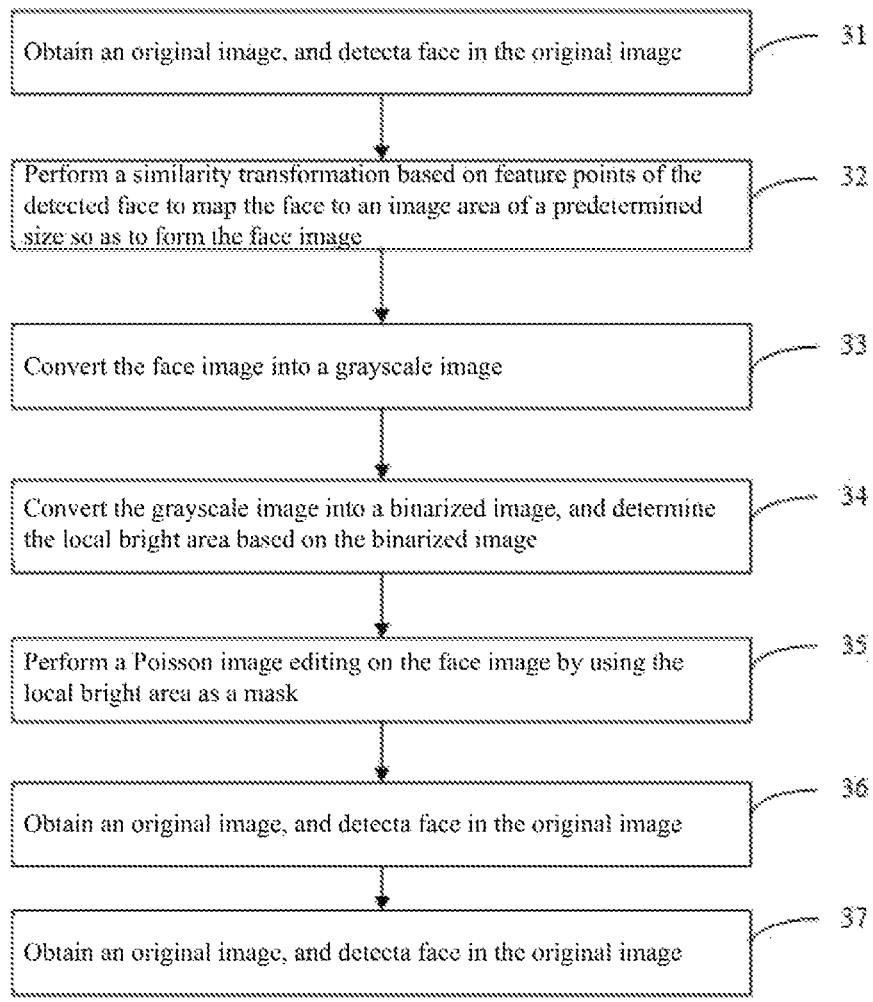
FIG. 3 is a flow chart of another embodiment of a face image quality evaluating method according to the present disclosure.

FIG. 3 is a flow chart of another embodiment of a face image quality evaluating method according to the present disclosure. As shown in FIG. 3, the method includes the following steps.

31: obtaining an original image, and detecting a face in the original image.

It can obtain one frame from a video to mark as the original image, and use a face detection method to extract a face from the original image, and then determine the position, size, and feature points of the face.

32: performing a similarity transformation based on feature points of the detected face to map the face to an image area of a predetermined size so as to form the face image.

Figure 4A:
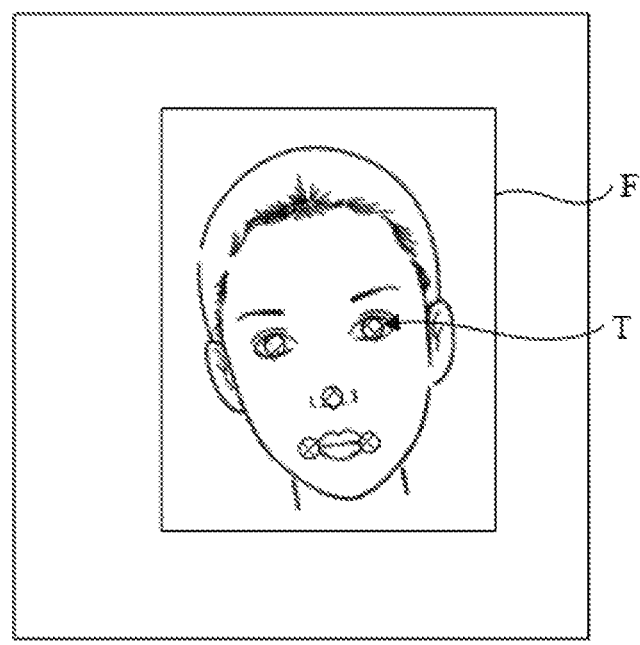
FIG. 4A is a schematic diagram of an example of an original image according to the embodiment of FIG. 3.
Figure 4B:
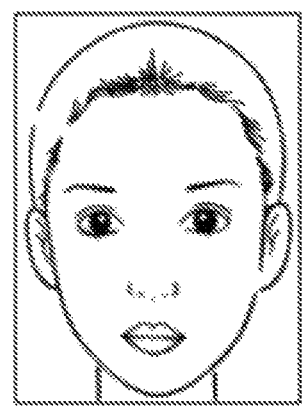
FIG. 4B is a schematic diagram of an example of a face image after face alignment processing according to the embodiment of FIG. 3.

It changes the size of the image to a predetermined size by using the detected feature points of the face, and reduces the proportion of non-face areas (i.e., the areas not including the face) as much as possible. FIG. 4A is a schematic diagram of an example of an original image according to the embodiment of FIG. 3; and FIG. 4B is a schematic diagram of an example of a face image after face alignment processing according to the embodiment of FIG. 3. As an example, as shown in FIG. 4A and FIG. 4B, by performing a face detection on the original image of FIG. 4A, it can obtain a face frame F and five feature points T. The size of the face image in FIG. 4A is M1*N1, and after performing an alignment process thereon, the size of the face image of FIG. 4B becomes M2*N2, where M2≤M1.

33: converting the face image into a grayscale image.

The obtained face image is a color image. In order to facilitate the extraction of the local bright area, the color image can be converted into the grayscale image.

34: converting the grayscale image into a binarized image, and determining the local bright area based on the binarized image.

Figure 5:
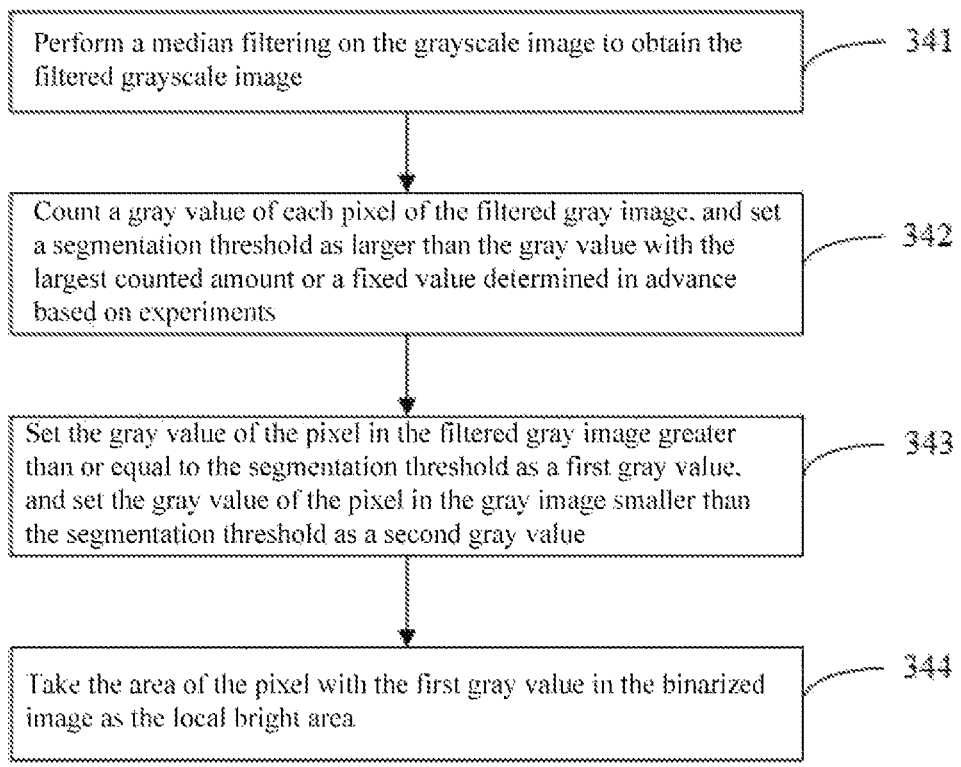
FIG. 5 is a flow chart of step 34 of the face image quality evaluating method according to the embodiment of FIG. 3.

FIG. 5 is a flow chart of step 34 of the face image quality evaluating method according to the embodiment of FIG. 3. In this embodiment, as shown in FIG. 5, the local bright area can be obtained by using the following steps.

341: performing a median filtering on the grayscale image to obtain the filtered grayscale image.

It can use a filter template of a*b to perform the median filtering on the gray image so as to replace the gray value at the center of the filter template with the median value of all the gray values in the filter template, thereby smoothing the gray image.

342: counting a gray value of each pixel of the filtered gray image, and setting a segmentation threshold as larger than the gray value with the largest counted amount or a fixed value determined in advance based on experiments.

In this embodiment, after filtering the grayscale image, the grayscale values of the filtered grayscale image can be counted to obtain the distribution of the grayscale values, and then the segmentation threshold can be determined according to the distribution of the grayscale values, where the segmentation threshold can be set as proportional with the gray value that has the largest amount of pixels. For example, if the size of the gray image is 8*8, according to the distribution of the gray values, assuming that the amount of pixels corresponding to the gray value 170 is 35, the gray value with the largest amount of pixels is 170, and the segmentation threshold can be set to 180; and assuming that the amount of pixels corresponding to the gray value 200 is 35, the gray value with the largest amount of pixels is 200, and the segmentation threshold can be set to 215.

In another embodiment, the segmentation threshold can be set by using historical experiences, that is, the segmentation threshold can be set to a fixed value determined in advance based on experiments, for example, setting the segmentation threshold to 180.

343: setting the gray value of the pixel in the filtered gray image greater than or equal to the segmentation threshold as a first gray value, and setting the gray value of the pixel in the gray image smaller than the segmentation threshold as a second gray value.

After the segmentation threshold is determined, it converts the filtered grayscale image into the binarized image according to the segmentation threshold. As an example, the grayscale value of the pixels with the grayscale value less than the segmentation threshold is set as the second grayscale value, and the gray value of the other pixels are is set to the first gray value. For example, if the segmentation threshold is 180 and the gray values of the filtered gray image are {200,234; 156,134; 179,252; 190,153}, the first gray value is {200, 234, 252, 190} and the second gray value is {156, 134, 179, 153}. In order to facilitate the observation of the details of the binarized image, it can set the first gray value to 255 and set the second gray value to 0.

344: taking the area of the pixel with the first gray value in the binarized image as the local bright area.

Because the gray value of the local bright area is relatively high, after the filtered gray image is segmented according to the segmentation threshold, the local bright area is retained, and the area corresponding to the first gray value can be regarded as the local bright area.

In this embodiment, in order to avoid the case that the local bright area in the binarized image cannot form a closed area, it can perform an expansion operation or a closed operation on the local bright area, such that the local bright area forms the closed area.

35: performing a Poisson image editing on the face image by using the local bright area as a mask.

Figure 6:
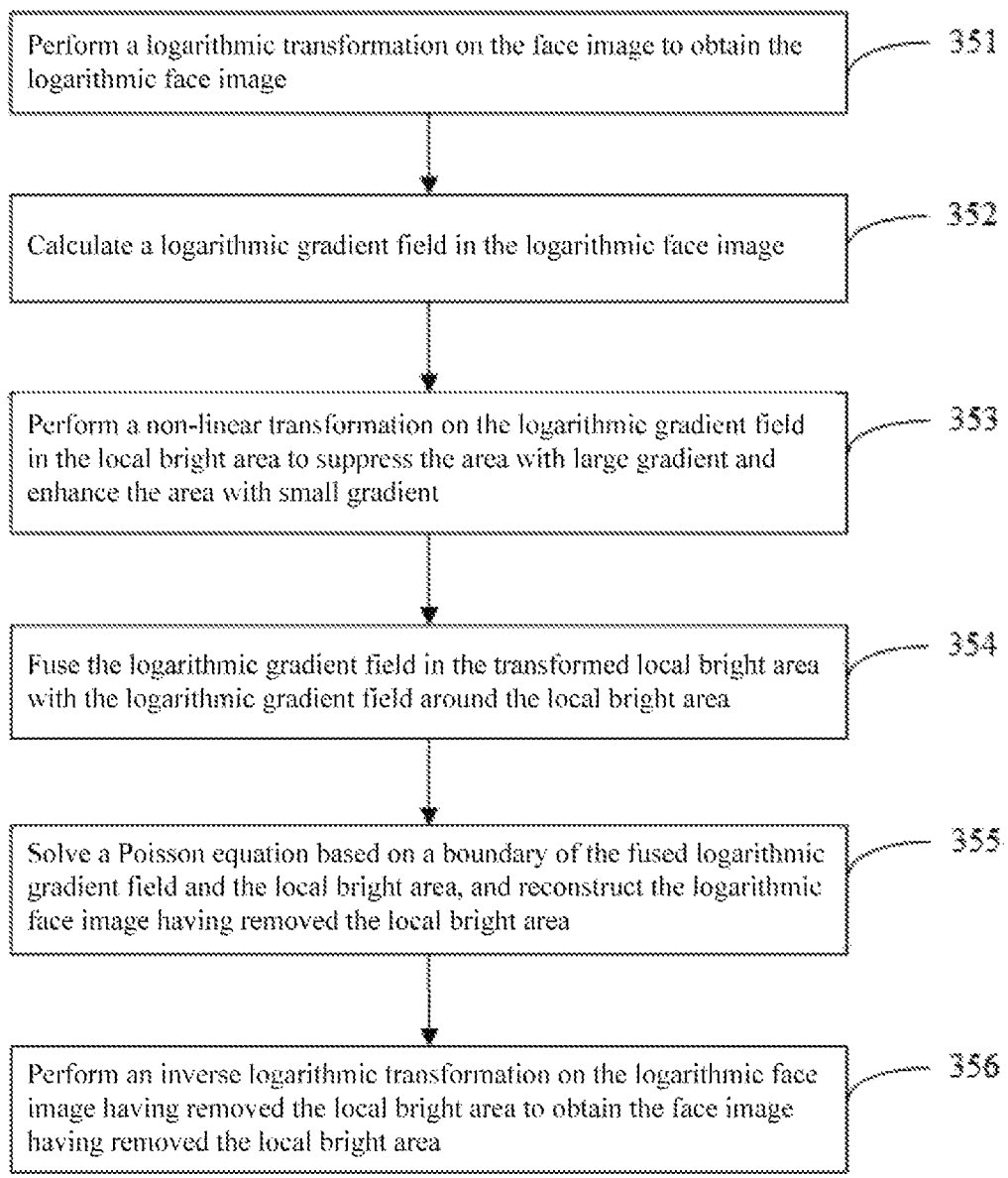
FIG. 6 is a flow chart of step 35 of the face image quality evaluating method according to the embodiment of FIG. 3.

FIG. 6 is a flow chart of step 35 of the face image quality evaluating method according to the embodiment of FIG. 3. As shown in FIG. 6, in this embodiment, the face image can be processed to obtain the face image that has removed the local bright area by using the following steps.

351: performing a logarithmic transformation on the face image to obtain the logarithmic face image.

It calculates the logarithm of the gray value of each pixel in the face image to obtain the logarithmic gray value in the logarithmic face image.

352: calculating a logarithmic gradient field in the logarithmic face image.

The logarithmic gradient can be calculated using the following formula:

$$G(i,j)=f(i+1,j)+f(i,j+1)-2f(i,j);$$

where, G(i, j) is the gradient at the coordinate (i, j) in the logarithmic face image, and f(i, j) is the logarithmic gray value at the coordinate (i, j) in the logarithmic face image.

353: performing a non-linear transformation on the logarithmic gradient field in the local bright area to suppress the area with large gradient and enhance the area with small gradient.

A non-linear function is used to process the logarithmic gradient field in the local bright area to obtain the transformed logarithmic gradient field. For example, the logarithmic gradient field of the local bright area before the transformation is [−3, −10; 20, 15], and the logarithmic gradient field of the transformed local bright area [−1, −5; 11, 8]. The area with large gradient is suppressed and the area with small gradient is enhanced so as to suppress bright lights.

354: fusing the logarithmic gradient field in the transformed local bright area with the logarithmic gradient field around the local bright area.

After the non-linear transformation is performed on the logarithmic gradient field in the local bright area, the logarithmic gradient field in the transformed local bright area and the logarithmic gradient field around the local bright area can be merged to obtain the logarithmic gradient field of the entire logarithmic face image and mark as the fused logarithmic gradient field.

355: solving a Poisson equation based on a boundary of the fused logarithmic gradient field and the local bright area, and reconstructing the logarithmic face image having removed the local bright area.

The relationship between the fused logarithmic gradient field and the reconstructed logarithmic face image gray value meets:

$$\Delta f^* = \text{div}(v); \text{ and}$$

$$\Delta f^* = f^*(i+1,j) + f^*(i,j+1) + f^*(i-1,j) + f^*(i,j-1) - 4f^*(i,j);$$

where, div( ) is the divergence function, v is the fused logarithmic gradient field, f*(i, j) is the gray value at the position (i, j) in the reconstructed logarithmic face image, and Δ is the Laplacian operator.

The relationship between the inner divergence and the gray value of the local bright area can be obtained by using the above-mentioned formula; the relationship between the peripheral divergence and the gray value of the local bright area can be obtained by using the Dirichlet boundary condition f*(i, j)=f(i, j); and based on the relationship between the inner divergence and the gray value, it can solve f(i, j).

In other embodiments, it can also obtain the relationship between the inner divergence and the gray value of the non-boundary area by using Δf*=div(v), obtain the relationship between the inner divergence and the gray value of the boundary region by using the Dirichlet boundary condition f*(i, j)=f(i, j), and solve f*(i, j) based on the relationship between the divergence and the gray value, where the boundary area is the area composed of the outermost pixels of the image.

356: performing an inverse logarithmic transformation on the logarithmic face image having removed the local bright area to obtain the face image having removed the local bright area.

After the reconstructed logarithmic face image is obtained, it can process each logarithmic gray value to obtain the gray value of the face image that has removed the local light.

The characteristics of the bright light in the grayscale image are relatively obvious, so the local bright light area can be found out by binarization. After the local bright area is obtained, the purpose of eliminating the local bright area can be achieved through the above-mentioned steps, so as to evaluate the quality of the face image.

36: calculating the Laplacian variance of the face image having removed the local bright area.

The LSE can be calculated using the following formula:

$$LSE = \sum_{i=2}^{M-1} \sum_{j=2}^{N-1} [o(f(i,j)) - o(f'(i,j))]^2;$$

$$o(f(i,j)) = f(i+1,j) + f(i-1,j) + f(i,j+1) + f(i,j-1) - 4f(i,j);$$

$$o'(f(i,j)) =$$

$$f'(i+1,j) + f'(i-1,j) + f'(i,j+1) + f'(i,j-1) - 4f'(i,j);$$

where, f(i, j) is the gray value at the position (i) in the face image that has removed the local bright area, f*(i, j) is the gray value at the position (i, j) in a reference face image. The reference face image is a pre-selected image, and the larger the Laplace variance, the better the quality of the face image.

37: obtaining a quality evaluation result of the face image based on the Laplacian variance of the face image.

After calculating the Laplacian variance of the face image, it can directly take the Laplacian variance as the quality evaluation result of the face image, or the Laplacian variance can be processed to take the processing result as the quality evaluation result of the face image.

The bright may have a greater impact on the gradient change of the entire face image, which leads to an increase in the LSE of the face image and causes a larger error in the quality of the face analysis using the LSE, and affects the selection of the face image with the best quality. In this embodiment, it provides a solution to solve the interference of the bright in a dynamic environment, the determination of the gradient can be accurate after removing the bright, and the original features of the face have not changed, hence the quality of the face image can be analyzed more accurately.

FIG. 7 is a schematic block diagram of an embodiment of a face image quality evaluating apparatus according to the present disclosure. A face image quality evaluating apparatus 70 is provided, which corresponds to the face image quality evaluating method described in the above-mentioned embodiment. As shown in FIG. 7, the face image quality evaluating apparatus 70 includes a storage 71 and a processor 72 that are coupled to each other. The storage 71 (e.g., a memory) is configured to store a computer program, where the computer program implements the face image quality evaluating method in the above-mentioned embodiment when executed by the processor 72.

In this embodiment, the face image quality assessment device 70 can effectively eliminate the influence of the bright to the analysis of the quality of the face image without destroying the feature information of the face, so as to analyze the quality of the face image more accurately and obtain the clearer face image, which can more easily obtain the optimal frame of the video stream in the key frame extraction of videos.

FIG. 8 is a schematic block diagram of an embodiment of a computer readable storage medium according to an embodiment of the present disclosure. A computer readable storage medium 80 is provided, which corresponds to the face image quality evaluating method described in the above-mentioned embodiment. As shown in FIG. 8, the computer readable storage medium 80 is configured to store a computer program 81. When the computer program 81 is executed by a processor, the face image quality evaluating method in the above-mentioned embodiment is implemented.

The computer readable storage medium 80 can be a server, a U disk, a mobile hard disk, a read-only memory (ROM), a random access memory (RAM), a magnetic disk, an optical disk, or other medium that can store program codes.

In the embodiments provided by the present disclosure, it should be understood that the disclosed method and apparatus (or device) may be implemented in other manners. For example, the above-mentioned apparatus embodiment is merely exemplary. For example, the division of modules or units is merely a logical functional division, and other division manner may be used in actual implementations, that is, multiple units or components may be combined or be integrated into another system, or some of the features may be ignored or not performed.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented face image quality evaluating method, comprising executing on a processor steps of:
   obtaining a face image;
   determining a local bright area in the face image, wherein the local bright area is formed by an illumination source in the face image, and the brightness of the local bright area is greater than the brightness of a face area in the face image;
   removing the local bright area from the face image; and
   evaluating a quality of the face image based on the face image having removed the local bright area;
   wherein the step of determining the local bright area in the face image comprises:
      converting the face image into a grayscale image;
      converting the grayscale image into a binarized image; and
      determining the local bright area based on the binarized image;
   wherein the step of converting the grayscale image into the binarized image comprises:
      performing a median filtering on the grayscale image to obtain the filtered grayscale image;
      counting a gray value of each pixel of the filtered gray image, and setting a segmentation threshold as one of larger than the gray value with the largest counted amount and a fixed value determined in advance based on experiments; and
      setting the gray value of the pixel in the filtered gray image greater than or equal to the segmentation threshold as a first gray value, and setting the gray value of the pixel in the gray image smaller than the segmentation threshold as a second gray value; and
   wherein the step of determining the local bright area based on the binarized image comprises:
      taking the area of the pixel with the first gray value in the binarized image as the local bright area.

2. The method of claim 1, wherein the step of obtaining the face image comprises:
   obtaining an original image;
   detecting a face in the original image; and
   performing a similarity transformation based on feature points of the detected face to map the face to an image area of a predetermined size so as to form the face image.

3. The method of claim 1, wherein after the step of determining the local bright area based on the binarized image further comprises:
   performing one of an expansion operation and a closed operation on the local bright area, such that the local bright area forms a closed area.

4. The method of claim 1, wherein the step of removing the local bright area from the face image comprises:
   performing a Poisson image editing on the face image by using the local bright area as a mask.

5. The method of claim 4, wherein the step of performing the Poisson image editing on the face image by using the local bright area as the mask comprises:
   performing a logarithmic transformation on the face image to obtain the logarithmic lace image;
   calculating a logarithmic gradient field in the logarithmic face image;
   performing a non-linear transformation on the logarithmic gradient field in the local bright area to suppress the area with large gradient and enhance the area with small gradient;
   fusing the logarithmic gradient field in the transformed local bright area with the logarithmic gradient field around the local bright area;
   solving a Poisson equation based on a boundary of the fused logarithmic gradient field and the local bright area, and reconstructing the logarithmic face image having removed the local bright area; and
   performing an inverse logarithmic transformation on the logarithmic face having removed the local bright, area to obtain the face image having removed the local bright area.

6. The method of claim 1, wherein the step of evaluating the quality of the face image based on the face image having removed the local bright area comprises:
   calculating a Laplacian variance of the face image having removed the local bright area; and
   obtaining a quality evaluation result of the face image based on the Laplacian variance of the face image.

7. A face image quality evaluating apparatus, comprising:
   a memory;
   a processor; and
   one or more computer programs stored in the memory and executable on the processor, wherein the one or more computer programs comprise:
   instructions for obtaining a face image;
   instructions for determining a local bright area in the face image, wherein the local bright area is formed by an illumination source in the face image, and the brightness of the local bright area is greater than the brightness of a face area in the face image;
   instructions for removing the local bright area from the face image; and instructions for evaluating a quality of the face image based on the face image having removed the local bright area;

wherein the instructions for determining the local bright area in the face image comprise:
    instructions for converting the face image into a grayscale image;
    instructions for converting the grayscale image into a binarized image; and
    instructions for determining the local bright area based on the binarized image;

wherein the instructions for converting the grayscale image into the binarized image comprise;
    instructions for performing a median filtering on the grayscale image to obtain the filtered grayscale image;
    instructions for counting a gray value of each pixel of the filtered gray image, and setting a segmentation threshold as one of larger than the gray value with the largest counted amount and a fixed value determined in advance based on experiments; and
    instructions for setting the gray value of the pixel in the filtered gray image greater than or equal to the segmentation threshold as a first gray value, and setting the gray value of the pixel in the gray image smaller than the segmentation threshold as a second gray value; and wherein the instructions for determining the local bright area based on the binarized image comprise:
    instructions for taking the area of the pixel with the first gray value in the binarized image as the local bright area.

8. The apparatus of claim 7, wherein the instructions for obtaining the face image comprise:
    instructions for obtaining an original image;
    instructions for detecting a face in the original image; and
    instructions for performing a similarity transformation based on feature points of the detected face to map the face to an image area of a predetermined size so as to form the face image.

9. The apparatus of claim 7, wherein the one or more computer programs further comprises:
    instructions for performing one of an expansion operation and a closed operation on the local bright area, such that the local bright area forms a closed area.

10. The apparatus of claim 7, wherein the instructions for removing the local bright area from the face image comprise:
    instructions for performing a Poisson image editing on the face image by using the local bright area as a mask.

11. The apparatus of claim 10, wherein the instructions for performing the Poisson image editing on the face image by using the local bright area as the mask comprise:
    instructions for performing a logarithmic transformation on the face image to obtain the logarithmic face image;
    instructions for calculating a logarithmic gradient field in the logarithmic face image;
    instructions for calculating a non-linear transformation on the logarithmic gradient field in the local bright area to suppress the area with large gradient and enhance the area with small gradient;
    instructions for fusing the logarithmic gradient field in the transformed local bright area with the logarithmic gradient field around the local bright area;
    instructions for solving a Poisson equation based on a boundary of the fused logarithmic gradient field and the local bright area, and reconstructing the logarithmic face image having removed the local bright area; and
    instructions for performing an inverse logarithmic transformation on the logarithmic face image having removed the local bright area to obtain the face image having removed the local bright area.

12. The apparatus of claim 7, wherein the instructions for evaluating the quality of the face image based on the face image having removed the local bright area comprise:
    instructions for calculating a Laplacian variance of the face image having removed the local bright area; and
    instructions for obtaining a quality evaluation result of the face image based on the Laplacian variance of the face image.

13. A non-transitory computer readable storage medium for storing one or more computer programs, wherein the one or more computer programs comprise:
    instructions for obtaining a face image;
    instructions for determining a local bright area in the face image, wherein the local bright area is formed by an illumination source in the face image, and the brightness of the local bright area is greater than the brightness of a face area in the face image;
    instructions for removing the local bright area from the face image; and
    instructions for evaluating a quality of the face image based on the face image having removed the local bright area;

wherein the instructions for determining the local bright area in the face image comprise:
    instructions for converting the face image into a grayscale image;
    instructions for converting the grayscale image into a binarized image; and
    instructions for determining the local bright area based on the binarized image;

wherein the instructions for converting the grayscale image into the binarized image comprise:
    instructions for performing a median filtering on the grayscale image to obtain the filtered grayscale image;
    instructions for counting a gray value of each pixel of the filtered gray image, and setting a segmentation threshold as one of larger than the gray value with the largest counted amount and a fixed value determined in advance based on experiments; and
    instructions for setting the gray value of the pixel in the filtered gray image greater than or equal to the segmentation threshold as a first gray value, and setting the gray value of the pixel in the gray image smaller than the segmentation threshold as a second gray value; and wherein the instructions for determining the local bright area based on the binarized image comprise:
    instructions for taking the area of the pixel with the first gray value in the binarized image as the local bright area.

14. The non-transitory computer readable storage medium of claim 13, wherein the instructions for obtaining the face image comprise;
    instructions for obtaining an original image;
    instructions for detecting a face in the original image; and
    instructions for performing a similarity transformation based on feature points of the detected face to map the face to an image area of a predetermined size so as to form the face image.

15. The non-transitory computer readable storage medium of claim 13, wherein the one or more computer programs further comprises:
instructions for performing one of an expansion operation and a closed operation on the local bright area, such that the local bright area forms a closed area.

16. The non-transitory computer readable storage medium of claim 13, wherein the instructions for removing the local bright area from the face image comprise;
instructions for performing a Poisson image editing on the face image by using the local bright area as a mask.

17. The non-transitory computer readable storage medium of claim 16, wherein the instructions for performing the Poisson image editing on the face image by using the local bright area as the mask comprise:
instructions for performing a logarithmic transformation on the face image to obtain the logarithmic face image;
instructions for calculating a logarithmic gradient field in the logarithmic face image;
instructions for performing a non-linear transformation on the logarithmic gradient field in the local bright area to suppress the area with large gradient and enhance the area with small gradient;
instructions for fusing the logarithmic gradient field in the transformed local bright area with the logarithmic gradient field around the local bright area;
instructions for solving a Poisson equation based on a boundary of the fused logarithmic gradient field and the local bright area and reconstructing the logarithmic lace image having removed the local bright area; and
instructions for performing an inverse logarithmic transformation on the logarithmic face image having removed the local bright area to obtain the face image having removed the local bright area.

18. The transitory computer readable storage medium claim 13, wherein the instructions for evaluating the quality of the face image based on the face image having removed the local bright area comprise;
instructions for calculating a Laplacian variance of the face image having rent oved the local bright area; and
instructions for obtaining a quality evaluation result of the face image based on the Laplacian variance of the face image.

* * * * *